No. 687,454. Patented Nov. 26, 1901.
L. R. FAUGHT.
CAR WHEEL.
(Application filed Sept. 25, 1901.)
(No Model.)
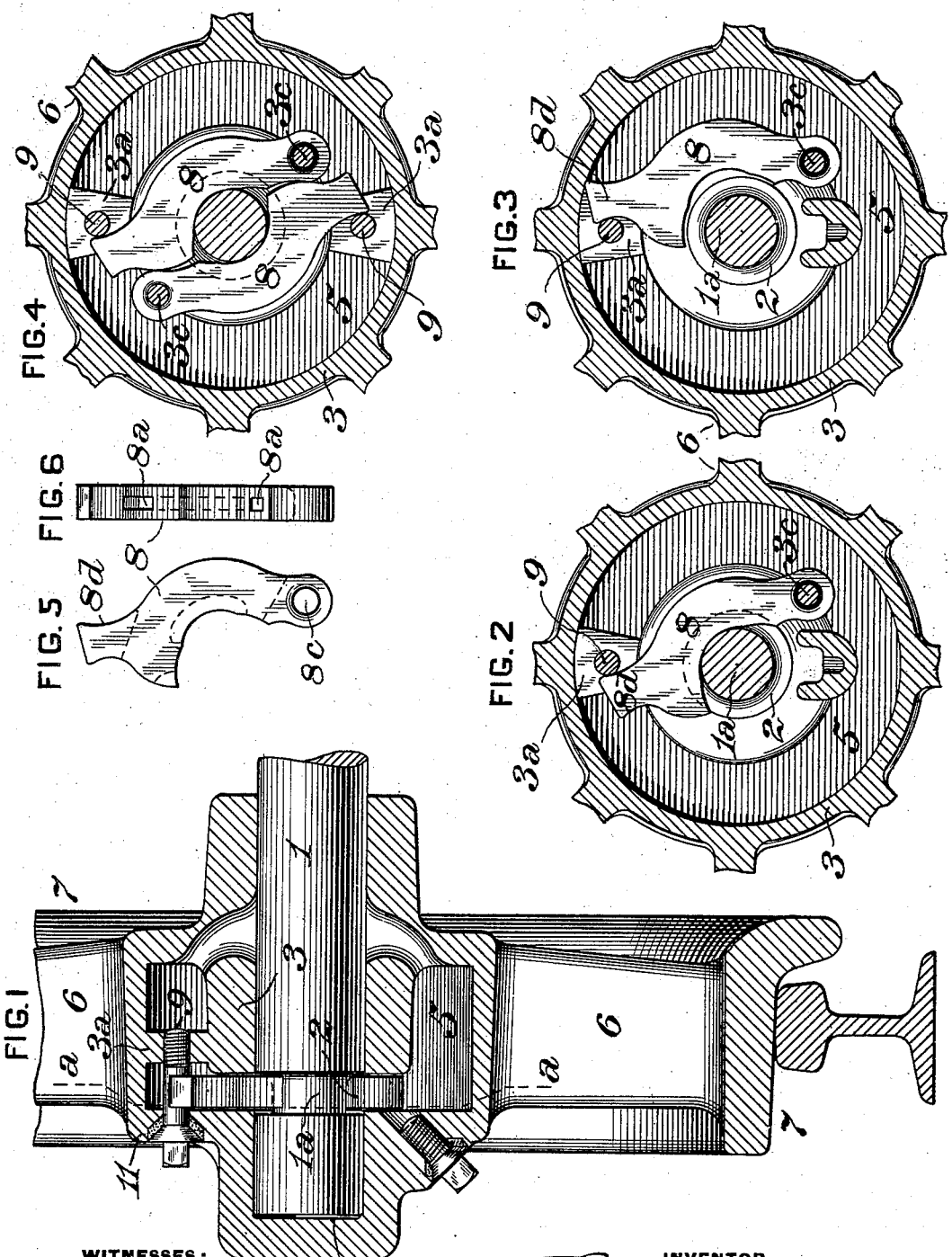

UNITED STATES PATENT OFFICE.

LUTHER R. FAUGHT, OF PHILADELPHIA, PENNSYLVANIA.

CAR-WHEEL.

SPECIFICATION forming part of Letters Patent No. 687,454, dated November 26, 1901.

Application filed September 25, 1901. Serial No. 76,450. (No model.)

*To all whom it may concern:*

Be it known that I, LUTHER R. FAUGHT, of Philadelphia, in the county of Philadelphia and State of Pennsylvania, have invented a certain new and useful Improvement in Car-Wheels, of which improvement the following is a specification.

My present invention more particularly relates to railroad-car wheels of the type ordinarily known as "loose" wheels, which are mounted upon their axles with the capacity of rotation independently thereof, but is equally applicable in connection with supporting or carrying wheels, either flanged or flat, of various other descriptions—as, for example, those employed in overhead trolleys and conveyers, warehouse and factory trucks, scales, and other vehicles or movable structures.

My present invention is an improvement upon that for which Letters Patent of the United States No. 321,590 were granted and issued to me under date of July 7, 1885; and its object is to provide means for attaining a more perfect performance of the functions of the invention of said Letters Patent—*i. e.*, those of maintaining a loose wheel in normal position upon its axle and enabling proper lubrication of the bearing-surfaces of the wheel to be effected, for preventing impairment of the normal action of the parts when the wheel and axle become worn, and for presenting a materially-increased area of bearing-surface in the connecting members of the wheel and axle.

The improvement claimed is hereinafter fully set forth.

In the construction set forth in Letters Patent No. 321,590 aforesaid the wheel is held in position longitudinally upon the axle by means of an insertible and removable connecting member, termed a "key-block," which fits in a recess or socket in the wheel-hub and engages an adjacent groove turned in the axle, the key-block being passed into the wheel through the central bore or opening through which the hub fits around the axle and after being engaged with the hub-socket and axle-groove being secured and held in such operative position by a locking screw or pin. While this construction has been found in an extended practice to satisfactorily perform the functions for which it was designed, it will be seen that the connecting key-block is necessarily subject to a structural restriction in its size whether the wheel be of the open or closed hub type, inasmuch as it cannot in any dimension be permitted to exceed the diameter of the bore of the hub, through which only it can be introduced into the wheel. This restriction of the dimensions of the key-block involves a corresponding limitation of the area of its bearing-surfaces on the axle-groove, which area to obtain the most effective results should be made as large as practicable.

My present invention provides a key-block which, as hereinafter explained, is not introduced through the bore of the wheel-hub and which when once installed in the hub is never removed therefrom and the dimensions of which are therefore not limited by the diameter of the bore. The increased area of bearing-surface of the key-block on the axle-groove which is made available by my improved construction materially enhances the effectiveness and durability of the connecting members.

In the accompanying drawings, Figure 1 is an axial section through a car-wheel with the axle thereof in elevation, illustrating an application of my invention; Fig. 2, a vertical transverse section through the same on the line *a a* of Fig. 1 with the key-block locked in operative position; Fig. 3, a similar section with the key-block released to permit of the insertion or removal of the axle into or from the wheel-hub; Fig. 4, a section similar to that of Fig. 2, showing the application of two key-blocks; Fig. 5, a front view of the key-block detached, and Fig. 6 an edge or side view of the same.

My invention is herein exemplified as applied in connection with a car-wheel which is substantially similar to that shown in Letters Patent No. 321,590 aforesaid—that is to say, one which is mounted and rotates freely upon a plain cylindrical axle 1, which is devoid of the usual raised collars and has an annular groove or recess 2 formed peripherally upon it adjacent to its ends. The hub 3 of the wheel is bored out to fit freely on the axle and is preferably closed entirely at its outer end, forming thereat on its inner side a transverse bearing-surface 4, which abuts against the end of the axle. An oil chamber or reservoir 5 is formed within the hub 3, communicating with the central bore thereof, and is adapted to be supplied with lubricant through an opening which is closed by a suitable removable plug, which may either be the locking-screw presently to be described or a plug specially provided for the purpose. The arms 6 and rim 7 of the wheel are of the usual construction.

The wheel is under my present invention maintained in normal position longitudinally upon the axle and its lateral movement thereon prevented by a key-block 8, which is preferably formed of cast-steel and which is distinguished from that of Letters Patent No. 321,590 in the essential and material structural particulars of being hinged or pivotally connected to the wheel-hub (in lieu of being held therein as against lateral displacement by side guides or stops) and of presenting a substantially greater area of bearing-surface for contact with the hub-axle bearing-surfaces than is obtainable with the construction of Letters Patent No. 321,590. The capability of employing a key-block possessing the characteristics above stated, as more fully hereinafter described, is resultant upon a novel manner of installing it in the wheel-hub, the same consisting in setting and supporting it in connection with a proper system of cores and vents in a mold and casting the wheel around it, the key-block being thereby inclosed in the wheel when cast in proper position to engage the groove 2 of the axle when the latter is inserted in the wheel. The method of locating the key-block in the wheel and the mold in which it is practiced, as above generally indicated, are not claimed as of my present invention and will constitute the subject-matter of separate applications to be filed in due time.

The key-block 8 is in the form of a segment of a ring of substantially rectangular cross-section and of such thickness as to fit within the axle-groove 2. Its inner surface is curved to fit over the neck 1ª of the axle, (which is that portion thereof at the bottom of the groove 2,) and it is provided at one end with an eye 8ᶜ, which fits on a pivot 3ᶜ, cast in the hub by the metal flowing in to form the same, and at the other end with a locking arm or dog 8ᵈ, which is so located as to rest when the key-block is in operative position against a locking screw or pin 9, which passes through an opening in the hub and engages a female thread in a rib 3ª, extending from the central portion of the hub to the shell or outer wall thereof. When the key-block is brought into position to engage the axle-groove and the locking-screw is inserted, as shown in Fig. 2, the key-block is held as against lateral displacement from the axle-groove and the axle cannot be withdrawn from the wheel. The withdrawal of the locking-screw permits the key-block to be swung outwardly by gravity on its pivot 3ᶜ, in which position, as shown in Fig. 3, the axle may be inserted in or removed from the wheel-hub, as desired. The locking-screw 9 serves also as an oil-hole plug and should be provided with a suitable packer 11 to prevent leakage.

The key-block 8 is preferably, as shown, cored out in such manner as to provide a longitudinal recess or space 8ª in its body, which recess is open at each of its ends. This space is formed in the key-block for the purposes of lightening it and of affording a lateral vent from the outer portion of the key-block to the main central vent of the mold in casting the wheel around the key-block.

As shown in Fig. 4, two key-blocks may, if desired, be employed, these being oppositely located and each held in place by a separate locking-screw 9. It will be seen that in such case bearing-surfaces are provided which extend entirely around the side walls of the groove 2 of the axle.

The connection of the wheel and axle is effected by turning the wheel into position in which the key-block pivot 3ᶜ will stand below the center, when the key-block will drop outward sufficiently far to clear the bore of the hub. The axle is then inserted and the wheel rotated until the key-block pivot is brought a short distance above the center, when it will drop into the axle-groove 2, and is then secured in such operative position by the locking-screw 9. By corresponding operations in reverse order the wheel and axle may be disconnected and the wheel removed from the axle when desired.

It will be seen that by reason of the novel form and manner of holding the key-block in the hub and of the fact that its dimensions are not, as in that of Letters Patent No. 321,590, limited by the diameter of the bore of the hub a substantial increase of the area of the bearing-surfaces of the key-block on the sides of the axle-groove and on the adjoining faces of the hub is made practicable. The large area of bearing-surface is of substantial advantage in practice in insuring the firm connection of the wheel and axle with the capacity of independent movement and in maintaining such firm connection under the general wear which occurs during the life of the wheel and axle. This wear causes the bore of the hub to become larger and the bearing-surface of the axle smaller, which discrepancy proportionately reduces the bearing-surface on the axle-groove. The ample bearing-surface which is provided by my present invention prevents any substantial impairment of the connected relation of the wheel and axle by the wear above referred to. It will further be obvious to those skilled in the art that while my invention has been herein set forth as applied in connection with wheels having hubs which are closed at their outer ends it is equally applicable in open-ended-hub wheels and also that when applied in a wheel of such character the opening in the end of the hub may, if desired, be closed by a cap or plug.

I claim as my invention and desire to secure by Letters Patent—

1. The combination of an axle having an annular groove, a wheel mounted freely on said axle, a key-block pivoted in the body of the wheel-hub and engaging the groove of the axle, and a locking pin or screw engaging the wheel-hub and retaining the key-block in the groove of the axle.

2. The combination of an axle having an annular groove, a wheel mounted freely on said axle, and having a pivot in the body of its hub adjacent to the groove of the axle, a key-block journaled on said pivot and vibratable about the axis thereof into and out of the groove of the axle, and a locking pin or screw engaging the wheel-hub and retaining the key-block in the groove of the axle.

3. The combination of an axle having an annular groove, a wheel mounted freely on said axle and having two pivots oppositely located in the body of its hub adjacent to the groove of the axle, two key-blocks, each journaled on one of said pivots and vibratable about the axis thereof into and out of the groove of the axle, and two locking pins or screws, each engaging the hub adjacent to the free end of one of the key-blocks and retaining said key-block in position.

4. The combination of an axle having an annular groove, a wheel mounted freely on said axle and having a pivot in the body of its hub adjacent to the groove of the axle, a key-block journaled at one end on said pivot and having a locking dog or projection adjacent to its opposite end, and a locking pin or screw engaging the wheel-hub in position to contact with the locking-dog.

5. The combination of an axle having an annular groove, a wheel mounted freely on said axle and having a pivot in the body of its hub adjacent to the screw of the axle, a key-block in which is formed an internal open-ended recess or space and which is journaled on said pivot and vibratable about the axis thereof into and out of the groove of the axle, and a locking pin or screw engaging the wheel-hub and retaining the key-block in the groove of the axle.

6. The combination of an axle having an annular groove, a wheel mounted freely on said axle and having a pivot in the body of its hub adjacent to the groove of the axle, a segment-formed key-block journaled at one end on said pivot and having lateral bearing-surfaces adapted to abut against bearing-surfaces on the groove of the axle and on the hub, and a locking pin or screw engaging the wheel-hub and retaining the key-block in the groove of the axle.

LUTHER R. FAUGHT.

Witnesses:
  ISAAC M. YOUNG,
  GEO. W. CLEMENT.